United States Patent [19]
Stempin et al.

[11] Patent Number: 5,514,494
[45] Date of Patent: May 7, 1996

[54] BATTERY SEPARATOR

[75] Inventors: John L. Stempin, Beaver Dams; Ronald L. Stewart, Big Flats; Dale R. Wexell, Corning, all of N.Y.

[73] Assignee: Corning Incorporated, Corning, N.Y.

[21] Appl. No.: 491,766

[22] Filed: Jun. 19, 1995

[51] Int. Cl.[6] ................................................ H01M 6/14
[52] U.S. Cl. ..................................... 429/204; 429/247
[58] Field of Search ............................. 429/247, 248, 429/204, 225, 228; 428/98

[56] References Cited

U.S. PATENT DOCUMENTS

| | | |
|---|---|---|
| Re. 15,067 | 3/1821 | Baird et al. . |
| 3,379,570 | 4/1968 | Berger et al. . |
| 3,446,668 | 5/1969 | Arrance et al. . |
| 3,446,669 | 5/1969 | Arrance et al. . |
| 3,489,610 | 1/1970 | Berger et al. . |
| 4,150,199 | 4/1979 | Tuphorn et al. ................. 429/247 X |
| 4,221,578 | 9/1980 | Shoup et al. . |
| 4,382,117 | 5/1983 | Kunze ............................. 429/247 X |
| 5,208,121 | 5/1993 | Yahnke et al. . |
| 5,342,709 | 8/1994 | Yahnke et al. . |

FOREIGN PATENT DOCUMENTS 042155  6/1968  Japan .

*Primary Examiner*—Anthony Skapars
*Attorney, Agent, or Firm*—Milton M. Peterson

[57] ABSTRACT

A battery assembly comprising a separator, spaced metal/metal oxide electrodes and a liquid electrolyte, the improvement comprising a rigid, porous, ceramic separator that is wettable by the liquid electrolyte, that has a porosity of 40–90 volume %, an average pore size in the range of 0.1–25 microns, a thickness of 1–12 mm, and a weight loss of not more than about 5% when exposed to $H_2SO_4$ having a specific gravity of 1.28 for 72 hours at 70°C.

15 Claims, 2 Drawing Sheets

BATTERY SEPARATOR

FIELD OF THE INVENTION

Separators for a metal-electrolyte-metal battery construction.

BACKGROUND OF THE INVENTION

Storage batteries, such as are used in vehicles and stationary equipment, may be relatively large in size. In contrast, batteries used in appliances, lighting devices, watches and the like may be relatively small. The present invention finds application across the size range of rechargeable batteries from small button batteries to large industrial batteries.

The oldest and best known type of rechargeable battery is that known as the lead-acid battery. While the present invention is not so limited, it has been developed as an improved lead-acid type battery. Accordingly, the description is primarily in terms of such a battery.

A typical lead-acid battery comprises a positive electrode, a negative electrode, one or more separators, and an electrolyte. The electrodes are commonly coated lead or lead alloy grids. They function both as electrical contacts and as mechanical load-bearing elements.

A separator may be any porous, perforated, or fibrous sheet that sufficiently isolates the electrodes to prevent short circuiting. However, the separator must also be sufficiently open to permit ion transfer through the electrolyte contained in the separator.

Perforated plastic, or glass fiber, sheets are commonly used as separators. A compressed mat of glass fibers is currently used in many commercial storage batteries. However, porous earthenware and sintered silicate sheets have also been proposed.

The electrolyte may be any ionizable liquid that can provide ion transtar between the electrodes. In a lead-acid battery, sulfuric acid is the electrolyte commonly employed.

A battery may be packaged in a plastic case for insulating purposes. However, the electrodes constitute the primary mechanical support and load-bearing means in current storage battery construction.

The glass fiber mat, now in use as a separator, has certain desirable features. It readily takes up and holds electrolyte, a property commonly referred to as wettability or wickability. It is also resistant to attack by the electrolyte, and provides acceptable electrical properties.

The fiber mat separator is, however, flexible and lacking in mechanical strength. This means that the electrodes, the casing, or other support members must be the primary source of structural integrity in a battery.

Consequently, a rigid, strong, light-weight separator, also having the desirable features of the glass fiber separator, would be a boon. It would provide structural support, facilitate automated production, and, depending on battery design and separator thickness, could reduce weight.

A factor in battery life is the tendency of material, e.g. lead compounds, to flake off an electrode during use of the battery. This undesirable occurrence is prevented to some extent by the compact battery assembly where the separator is compressed between the electrodes. However, since either a glass fiber mat, or a polymer separator, is flexible, it may still distort and permit electrode disintegration. A rigid separator would avoid this undesirable occurrence.

A rigid, relatively strong separator would also reduce manufacturing costs by permitting automated operations. Heretofore, efforts to automate battery construction have been hampered by the lack of rigidity in the glass fiber separator. Consequently, battery assembly has remained a manual operation to a large extent.

It is a major purpose of our invention to provide an improved battery construction embodying a rigid, porous separator. It is a further purpose to provide a battery that exhibits more consistent operating properties, and that has a longer life time than currently available batteries. Finally, it is a purpose to provide such an improved battery with a simple construction that lends itself to automated assembly.

SUMMARY OF THE INVENTION

Our invention resides in an improved rechargeable battery assembly comprising a liquid electrolyte, spaced metal electrodes and a separator between the electrodes, the improvement comprising a rigid, porous, ceramic separator that is wettable by the liquid electrolyte, that has a porosity of 40–90%, an average pore size of 0.1–25 microns and a thickness of 1–12 mm and that has a weight loss of less than 5% when refluxed in $H_2SO_4$ of 1.28 specific gravity for 72 hours at 70° C.

PRIOR ART

The prior art considered to have possible relevance is described in a separate paper.

DESCRIPTION OF THE INVENTION

Our invention is predicated on our development of a battery construction wherein the separator component is a rigid, porous, ceramic body. It is further predicated on our discovery that such a separator can provide a battery having electrical properties superior to those now provided by commercial batteries with glass fiber separators, and will also exhibit a chemical durability at least equal to that now provided by such glass fiber separators.

Our rigid, ceramic separator provides a mechanically strong structure that facilitates battery production. It also protects the battery from damage in handling, thus extending service life. It further provides more consistent operating properties, thereby resulting in a longer and more reliable service life.

Another feature of the new separator is that it permits a battery to operate in a recombinant mode. This means that gases generated as the battery operates, mainly hydrogen and oxygen, readily combine. Consequently, they are not trapped in pockets in the pores, as can happen if a separator warps or distorts.

Batteries are commonly classified as either a flooded type or a starved, or sealed, type. In both types, the electrodes are compressed against the separator and held in that assembly. The metal grids are coated with a paste material to form a porous layer as pan of the electrodes. This porous coating, as well as the separator become saturated with electrolyte. In the flooded type, the electrode and separator assembly is immersed in excess electrolyte so that the open space around the assembly is filled with electrolyte, e.g. sulfuric acid. In the starved, or sealed, type, the electrolyte is completely contained within the pores of the separator and electrode paste. In this construction, it is important that the electrolyte be retained in the pores to avoid leakage of the corrosive acid electrolyte.

The separator of the present invention finds application in both types of batteries. Its rigid nature is particularly useful since it does not expand or distort, thus preventing flaking from the electrodes and trapping of gases.

Figure 1:
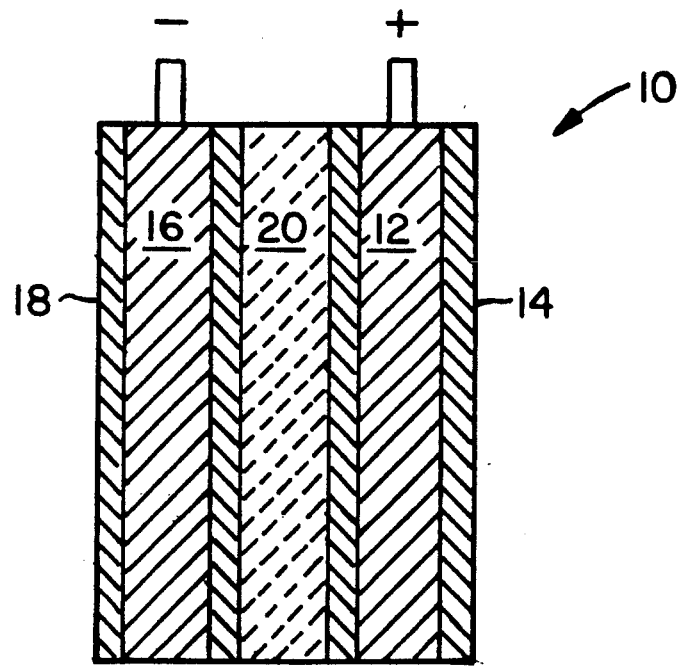
FIG. 1 is a side view in cross-section of a typical, single cell construction for a sealed rechargeable battery.

FIG. 1 is a schematic side view in cross-section showing the typical construction in a single cell, present day, electrode and separator assembly. The assembly is generally designated by the numeral 10. Assembly 10 comprises a positive metal grid 12 coated with a positive active coating 14 that permits electrical access to metal grid 12. Assembly 10 further has a negative grid 16, also having a negative active coating 18 similar to coating 14. Metal grids 12 and 16 are electrically connected to external negative and positive terminals, respectively.

Metal grids 12 and 16 are pressed against and pasted to separator component 20. Separator 20 is a thin, porous member containing electrolyte in its pores. Separator 20 is commonly a glass fiber mat, or a perforated sheet of an organic polymer, in current commercial batteries.

Figure 2:
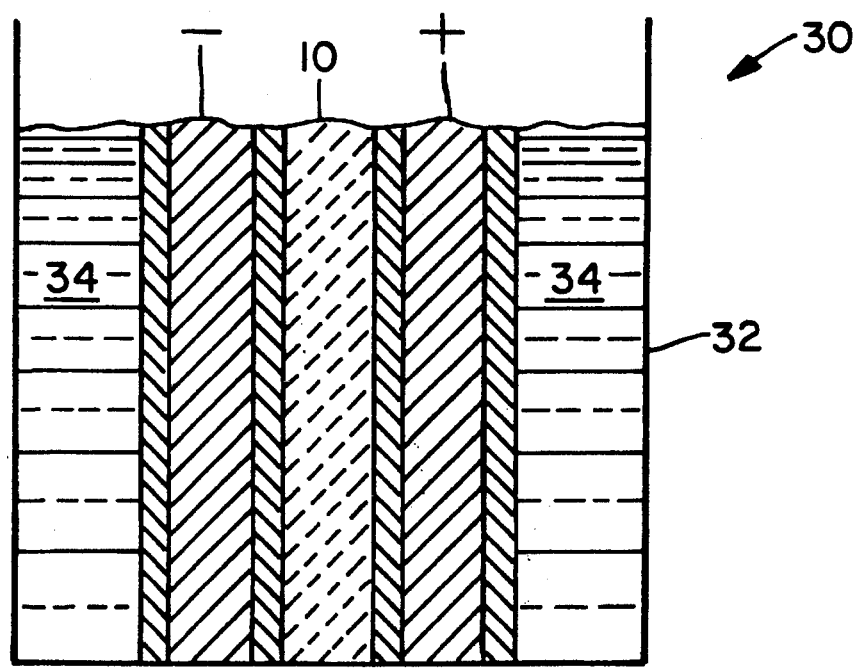
FIG. 2 is a side view in cross-section of a typical, single cell, flooded, storage battery construction.

FIG. 2 is a side view in cross-section illustrating a flooded-type storage battery generally designated by the numeral 30. The electrode and separator assembly 10 is mounted in a plastic container 32 and surrounded by liquid electrolyte 34. In a lead-acid battery, electrolyte 34 is usually dilute sulfuric acid. Current is generated in the battery by flow of ions through the separator between the electrodes. In a starved-type battery, the electrode-separator assembly 10 is encased tightly within a casing with no excess electrolyte. The electrolyte is completely contained within the pores of separator 20 and must be retained therein.

Our improved separator is the focal feature of the present invention. It may be employed in either a flooded type battery as illustrated in FIG. 2, or in a sealed type battery. Thus, it will replace separator 20 in the electrode-separator assembly shown in FIG. 1.

A variety of features, or properties, are required in a battery separator. These include:

1. Sufficient porosity
2. Controlled electrical properties
3. Mechanical strength
4. Chemical durability
5. Wickability The porosity of a material involves both pore volume and pore size. Pore volume refers to the volume percent of the body occupied by pores. At least a minimum pore volume is necessary to provide sufficient electrolyte in the separator and connectivity for ion transfer. Too low a volume fails to provide an adequately low internal resistance (impedance). In other words, the available voltage during discharge is reduced, and the voltage during formation is increased, to too great a degree.

A pore volume of at least about 40% is required in our ceramic separator. We prefer as high a pore volume, in the range of 60–85%, as is compatible with other factors such as mechanical strength.

Pore size is significant both for its effect on pore volume and its effect on wickability. The latter is the ability of a porous body to take up a liquid by capillary action. It may be measured in terms of time for a liquid to rise to a certain level when the porous body is suspended in the liquid.

Pore sizes in our separator may vary from 0.1 to 25 microns. Too large a pore size is undesirable, particularly in a sealed type battery. The battery then tends to leak, that is, to not hold the electrolyte properly. The preferred pore size for any application is dependent on, and influences, relative porosity, cell impedance, required battery performance characteristics and choice of ceramic material substrate.

An electrical circuit, such as a battery, contains resistance (R), capacitance (C) and inductance (L). An impedance Z is defined to calculate the overall retarding effect on current of components with R, L or C. The impedance is critical to operation of a battery and expresses the system's slow response to a stimulus, namely the effect on current flow upon application of a stimulus (charging and discharging). Power (E in watts) in the alternating current (AC) mode of batteries is defined as the product of the current ($I_{ac}$ in amperes) and the impedance (Z in ohms) for the AC components of the battery only. Impedance invariably reduces the theoretical voltage of a battery to a lower working voltage.

Successful battery performance requires ability to accept and maintain a charge. To this end, the impedance value must be relatively low. During battery formation a total energy input is targeted in terms of a fixed ampere-hours/pound (Ah/lb). This input must occur with the voltage in any cell not exceeding a certain level. Normal practice is to provide a total energy input of 185 Ah/lb while maintaining the impressed voltage below 2.7 volts. If the porosity of a separator is too low, the impressed voltage will exceed the permissible limit. This necessitates cutting back the energy input level, a situation that interferes with proper formation of the battery.

The capacity of a cell is expressed as the total quantity of electricity involved in the electrochemical reaction. It is defined as the number of coulombs or ampere-hours (Ah). The ampere-hour capacity of a battery is directly associated with the quantity of electricity obtained from the active materials.

A further requirement is a minimum capacity level in ampere-hours during a discharge cycle. The discharge capacity is measured at a certain current and time required to reach a certain voltage. For example, a battery may be discharged at a current of 200–500 milliamperes for a predetermined time. Alternatively, the capacity may be determined in terms of the time required to reach a fixed voltage, e.g. 1.75 volts. Again, if the porosity is too low, and the consequent internal resistance too high, the capacity of the battery is reduced.

Our separator will take the form of a thin sheet or plate. The thickness of this sheet is also a factor to consider. It should not exceed about 12 mm, and a thickness of 1–4 mm is preferred for most applications. However, the thickness of the separator must be balanced against both strength and porosity factors. Thus, a fragile material may require a greater thickness.

Other electrical properties of concern are consistency in cell performance and life time. The matter of consistency is of particular concern in large multicell batteries connected in series. There, the overall performance can be no better than that of the weakest cell. The inherent flexibility and lack of mechanical stability in glass fiber mat separators have contributed to erratic battery performance and life time.

The rigid separator of the present invention is particularly advantageous in respect of electrical stability. It resists warping or damage from handling or installation. It also resists flexing due to thermal expansion, since the expansion properties of ceramics are much lower than rubber polymers.

The significance of good mechanical strength has been noted relative to electrical stability. It is also an important factor in battery production. A rigid separator that has sufficient strength to permit automated assembly has the potential to generate considerable cost reduction.

Chemical durability is necessary since the separator is exposed to the electrolyte. The industry test used for a lead-acid battery separator involves exposure of the material to sulfuric acid solution of 1.28 specific gravity for 72 hours at 70° C. The material must exhibit a weight loss that is less than 5% to be acceptable. For convenience in coordinating testing, we have adopted a more stringent test that involves exposure to 40% sulfuric acid for 96 hours at 95° C. Further, we have required that weight loss in this more stringent test not exceed about 2%.

Finally, a porous material must have good wickability. This is a measure of the ability for the pores to take up electrolyte by capillary action. For example, a glass fiber mat separator typically will allow a sulfuric acid electrolyte to rise to a height of 7.5 cm (3") in a period of 3 minutes. If the wickability of a material is on the low side, it is possible to resort to vacuum filling of the separator. However, this adds to production time and cost, and hence is desirable to avoid.

Any ceramic material that exhibits porosity and chemical durability characteristics as defined herein may be satisfactory as a battery separator. Several porous ceramic materials have been found to meet the various requirements for use as a battery separator. These include porous silica prepared by sol-gel procedures; also, alumina, mullite and alumina-mullite mixtures prepared either by sol-gel procedures or by extrusion. Examples of unsuitable materials are keatite and cordierite. Porous keatite might be used, except the lithium ions would have to be replaced by ion exchange to impart adequate chemical durability. This step makes the material impractical. Porous cordierite has too great a solubility to permit its use.

Porous ceramic bodies suitable for present purposes may be prepared in various ways. One way is to employ known sol-gel procedures. Thus, a sol may be prepared with precursor materials. The sol is cast in a form of desired shape and allowed to gel. The gel is then washed to remove undesired materials such as alkalies. It may then be cut into sheets of desired size and used as is, or may be partially sintered.

While any of the ceramic separators may be prepared by the sol-gel process, we prefer to use this process for silica and alumina. For example, a particularly desirable procedure for producing porous silica is described in U.S. Pat. No. 4,112,032 (Blaszyk et al.). The procedure of the patent may be simplified somewhat, particularly in washing, depending on the purity required.

Our preferred ceramic materials for separator purposes are composed of alumina or mullite alone or mixed with each other. Sources of these materials in powder form are mixed with methylcellulose, a dispersant and water to form extrudable mixtures. The mixtures are extruded in ribbon form having a desired thickness and are fired to produce test samples.

The resulting bodies generally have porosities on the order of 40%. In order to increase these porosity values, the compositions prepared for extrusion are mixed with graphite filler in amounts up to 75%. When the extruded body is then fired, the graphite burns out, thereby enhancing the porosity of the body to as much as 85%.

SPECIFIC EMBODIMENTS

Development work has been largely carried out with our preferred materials, extruded alumina, mullite, or alumina/mullite mixtures. These materials have been mixed with graphite prior to extrusion. As noted earlier, the graphite burns out of the extruded material to provide bodies with improved porosities.

TABLE I shows batch compositions in pans by weight for a series of mixtures which, when extruded and fired, provide bodies composed of 33% mullite and 67% alumina.

TABLE I

| Batch Materials | 1 | 2 | 3 | 4 | 5 | 6 | 7 |
|---|---|---|---|---|---|---|---|
| Platelet clay | 16.66 | 14.13 | 11.63 | 9.14 | 7.80 | 5.82 | 4.16 |
| Stacked clay | 5.54 | 4.71 | 3.88 | 3.05 | 2.49 | 1.94 | 1.39 |
| Calcined clay | 27.61 | 23.47 | 19.34 | 15.19 | 12.42 | 9.66 | 6.90 |
| Alumina | 50.73 | 42.67 | 35.16 | 27.63 | 22.60 | 17.58 | 12.56 |
| Graphite | — | 15 | 30 | 45 | 55 | 65 | 75 |
| Methyl cellulose | 3 | 3 | 3 | 3 | 3 | 3 | 3 |
| Dispersant | 0.7 | 0.7 | 0.7 | 0.7 | 0.7 | 0.7 | 0.7 |
| Water | 27.5 | 27.5 | 27.5 | 27.5 | 27.5 | 27.5 | 27.5 |

The basic batches, prior to addition of graphite, were originally designed for preparation of support substrates exposed to temperature cycling. Accordingly, combinations of platelet, stacked and calcined clays (kaolin) were employed to control expansion effects by crystal orientation. The thermal expansion effects of the different clays, not of significance here, are explained in detail in U.S. Pat. No. 3,885,977 (Lachman et al.)

TABLE II shows batch compositions in parts by weight for a similar series of materials which, when extruded and fired, produce alumina bodies of varying porosity.

TABLE II

| Batch Materials | 8 | 9 | 10 | 11 |
|---|---|---|---|---|
| Alumina | 100 | 75 | 50 | 25 |
| Graphite | — | 25 | 50 | 75 |
| Methyl cellulose | 3 | 3 | 3 | 3 |
| Dispersant | 0.7 | 0.7 | 0.7 | 0.7 |
| Water | 27.5 | 27.5 | 27.5 | 27.5 |

TABLE III shows properties for fired, porous bodies produced from the batches shown in TABLES I and II.

TABLE III

| Example | MOR Mpa (psi) | Porosity (%) | Pore Size (Microns) |
|---|---|---|---|
| 1 | 51.2 (7400) | 40.4 | 0.49 |
| 2 | 27.6 (4010) | 50.7 | 0.60 |
| 3 | 14.9 (2160) | 58.6 | 1.17 |
| 4 | 6.7 (973) | 68.6 | 3.88 |
| 5 | 3.0 (431) | 72.5 | 5.30 |
| 6 | 1.75 (253) | 76.8 | 6.64 |
| 7 | 1.6 (232) | 82.1 | 8.43 |
| 8 | 28.7 (4180) | 40.3 | 1.07 |
| 9 | 7.4 (1080) | 57.1 | 1.91 |
| 10 | 3.1 (456) | 60.2 | 10.21 |
| 11 | <0.7 (<100) | 85.0 | 13.93 |

A series of six 3-cell batteries was produced for cycle life testing. The test was designed to continue through 100 cycles.

The batteries were constructed as described above employing standard lead-acid battery components, except for the separators. The separators for four of the batteries were produced by extruding test pieces having batches corresponding to those shown in TABLE I above. The extruded test pieces were provided with graphite contents adapted to provide porosities of about 70% and 50% in the fired state. The batches were formulated to provide a composition of 67% alumina and 33% mullite in the fired state. Two of the six batteries were prepared having separators exhibiting each porosity level. Each battery employed 7 cm×4.5 cm (2¾"×1¾") separators. In one battery the thickness was 2 mm; in the other, the thickness was 4 mm. Also, two commercial style batteries having glass fiber mat separators with porosities of about 90% were prepared for testing as a benchmark or standard. They were prepared using a similar, well-known construction procedure.

The cells thus prepared were formed by charging at 2.5 volts; placed at 2.3 volts for 30 minutes; and open circuited for a minimum of one hour. The AC impedance was measured with a H/P 1000 cycle milliohmmeter and the open circuit voltage measured.

The cycling test was then initiated on all batteries. This consisted of discharging the battery at 1.2 amperes to an end voltage of 1.75 volts. The discharged battery was then recharged to 120% of the cell with the highest ampere-hour output. This cycle was continued 100 times.

The lead/acid cells assembled with the mullite/alumina extruded ceramic separators displayed uniform capacity and voltage parameters through the 100 cycles of charge/discharge cycling. In contrast, the control cells with the commercial glass mat separators displayed considerably greater deviations in both respects. They also had to be cut back in discharge voltage after about 50 hours, thus indicating an effective life time of about half that of the batteries with the mullite/alumina separators.

TABLE IV compares certain relevant properties of the tested batteries. Batteries having alumina/mullite separators with 70% and 50% porosity were compared with the benchmark batteries having commercial glass mat separators with a porosity of about 90%.

TABLE IV

|  | 70% Porosity | 50% Porosity | Glass mat Control |
|---|---|---|---|
| Voltage (V) | 2.1 | 2.1 | 2.1 |
| Impedance (Ω) | 19 | 23 | 17 |
| Current capacity (Ah-50 cycles) | 4.95 | 4.65 | 4.85 |
| Current capacity (Ah-100 cycles) | 4.40* | 4.30* | 4.30* |
| Power density (Wh/kg) | 44 | 44 | 45 |

*No deep discharge after 50 cycles.

Figure 3:
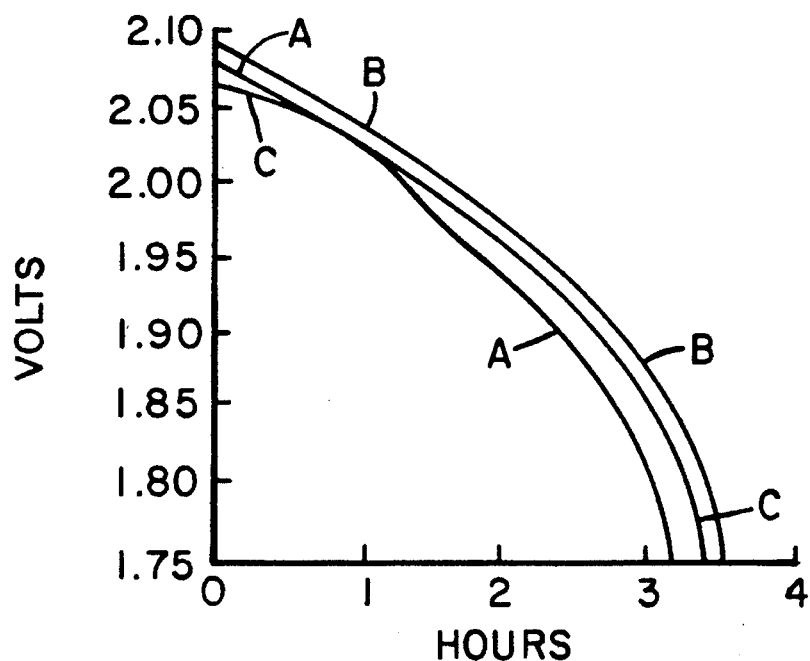
FIGS. 3 and 4 are graphical illustrations of properties exhibited by batteries in accordance with the invention.

FIG. 3 is a graphical representation of performance in three batteries of essentially the same construction, except for the porous separator. Cell voltage is plotted on the vertical axis. The times in hours to discharge to the cutoff point of 1.75 volts are shown by the intercepts on the horizontal axis.

The curve labeled A represents the rate of discharge for a battery with a mullite-alumina extruded separator having a 50% porosity. Curve B represents the rate of discharge for a battery having the same mullite-alumina separator, but with a porosity of 70%. Curve C illustrates the discharge rate for a battery with a glass fiber separator having a reported porosity of about 90%. It will be observed that the discharge curves are quite similar. However, the separator with 70% porosity shows somewhat better performance than the separator with 50% porosity.

Figure 4:
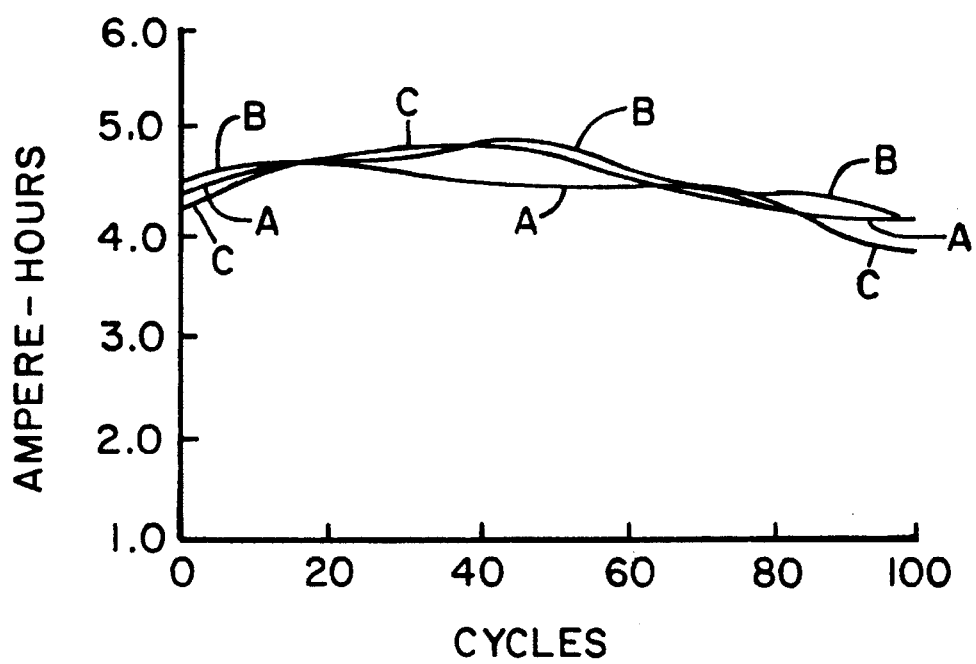

FIG. 4 is also a graphical representation in which the performance of extruded, mullite-alumina, porous ceramic separators are compared with a glass fiber separator. In FIG. 4, the numbers of discharge-recharge cycles are plotted on the horizontal axis and the battery capacity in ampere-hours is plotted on the vertical axis.

Curve A again represents the 50% porosity mullite-alumina separator, while Curve B represents the 70% porosity separator. Curve C represents the glass fiber separator. It will be observed that the performances here are also very similar.

Additional test batteries have been made in similar manner to that described above, except that porous silica separators were used instead of extruded alumina-mullite separators. The separators were prepared in accordance with the practice set forth in the Blaszyk et al. patent mentioned earlier.

This involved mixing aqueous solutions of potassium silicate and colloidal silica; then adding additional potassium silicate and then formamide to cause gelling. The mixture was allowed to gel for 24 hours; then cut to desired shapes and the shapes repeatedly leached with ammonium nitrate. This was followed by leaching with HCl and repeated washing to remove the HCl.

The porous silica bodies thus prepared were then heated for 16 hours at either 850° C. or 1150° C. to partially sinter the material while retaining porosity. The bodies had porosities of 86% and 81%, respectively. Their densities were on the order of 0.3 g/cc.

The porous bodies were cut into 7 cm×4.5 cm (2¾"×1¾") samples having 4 mm thickness for preparing batteries. The samples showed a weight loss of 0.42% in the standard acid durability test; mechanical strengths of 0.6-7.7 Mpa (87-1120 psi); and pore sizes of 0.2-0.3 microns. Larger pore sizes can be obtained by modifying the processing procedure. However, loss of mechanical strength also occurs when this is done.

Two 7-plate, lead-acid cells, one flooded and one starved, were constructed. They were placed on cycle testing with complete 100% discharge to 1.75 volts. After ten cycles, the discharge behavior of the two types were essentially the same and their capacities were unchanged. The capacities when discharged to 1.75 volts were approximately seven hours at 1.2 amperes or 8.4 ampere-hours.

We claim:

1. A rechargeable battery assembly comprising a liquid electrolyte, spaced metal/metal oxide electrodes and a separator between the electrodes, the improvement comprising a rigid, porous, ceramic separator that is wettable by the liquid electrolyte, that has a porosity of 40–90 volume %, an average pore size in the range of 0.1–25 microns, a thickness of 1–12 mm, and a weight loss of not more than about 5% when refluxed in $H_2SO_4$ of 1.28 specific gravity for 72 hours at 70° C.

2. A battery assembly in accordance with claim 1 wherein the battery is a flooded type.

3. A battery assembly in accordance with claim 1 wherein the battery is a sealed type.

4. A battery assembly in accordance with claim 1 wherein the battery electrodes are lead or lead alloy and the electrolyte is sulfuric acid.

5. A battery assembly in accordance with claim 1 wherein the ceramic separator comprises a porous ceramic selected from the group consisting of silica, alumina, mullite and alumina-mullite mixtures.

6. A battery assembly in accordance with claim 5 wherein the porous ceramic separator is composed of alumina or a mixture of alumina and mullite.

7. A battery assembly in accordance with claim 5 wherein the porous ceramic separator is composed of a mixture of alumina and mullite.

8. A battery assembly in accordance with claim 7 wherein the porous ceramic separator is composed of 67% alumina and 33% mullite.

9. A battery assembly in accordance with claim 5 wherein the porous ceramic separator is an extruded body having an average pore size of 5–10 microns.

10. A battery assembly in accordance with claim 5 wherein the porosity is at least 70%.

11. A porous, ceramic battery separator that is wettable by a liquid electrolyte, that has a porosity of 40–90 volume %, an average pore size in the range of 0.1–25 microns, a thickness of 1–12 mm, and a weight loss of not more than 5% when exposed to $H_2SO_4$ of 1.28 specific gravity for 72 hours at 70° C.

12. A battery separator in accordance with claim 11 wherein the porous ceramic is selected from the group composed of silica, alumina, mullite, and alumina-mullite mixtures.

13. A battery separator in accordance with claim 12 wherein the ceramic is alumina or a mixture of alumina and mullite.

14. A battery separator in accordance with claim 13 wherein the selected ceramic is a mixture of alumina and mullite.

15. A battery separator in accordance with claim 14 wherein the ceramic is composed of 67% alumina and 33% mullite.

* * * * *